United States Patent [19]

Hubbard et al.

[11] Patent Number: 4,466,994

[45] Date of Patent: Aug. 21, 1984

[54] HEAT TRANSFERABLE LABELS

[75] Inventors: Karl E. Hubbard, South Grafton; Augustus Ventre, Saugus, both of Mass.

[73] Assignee: Dennison Manufacturing Company, Framingham, Mass.

[21] Appl. No.: 517,884

[22] Filed: Jul. 27, 1983

Related U.S. Application Data

[63] Continuation-in-part of Ser. No. 305,665, Sep. 24, 1981, abandoned.

[51] Int. Cl.$^3$ .......................... B05D 3/06; B41M 5/00
[52] U.S. Cl. .................................... 427/56.1; 427/55; 427/148; 427/228; 427/282; 427/287
[58] Field of Search ................ 427/55, 148, 282, 56.1, 427/287, 228; 428/914, 202, 207, 208

[56] References Cited

U.S. PATENT DOCUMENTS

| | | | |
|---|---|---|---|
| 3,616,015 | 10/1971 | Kingston | 427/148 |
| 4,148,604 | 4/1979 | Bächtiger | 427/282 |
| 4,302,487 | 11/1981 | Lister | 427/56.1 |
| 4,315,790 | 2/1982 | Rattee et al. | 427/148 |

FOREIGN PATENT DOCUMENTS 1393992  5/1975  United Kingdom ................ 427/148

OTHER PUBLICATIONS

*The Condensed Chemical Dictionary*, 6th Ed., Rheinhold, N.Y., 1961, p. 1206.

*Primary Examiner*—Norman Morgenstern
*Assistant Examiner*—Janyce A. Bell
*Attorney, Agent, or Firm*—Barry D. Josephs; Arthur B. Moore; George E. Kersey

[57] ABSTRACT

A screen printing process for imprinting an ink design over release coat substrates carried on a web to form heat transferrable labels. The process includes screen printing an ink design image onto the substrate followed by passing the imprinted substrates through a drying section and subsequently transferring the design image to an article. The ink formulation used in the screen printing step is composed of a base ink vehicle containing a polyamide adhesive resin and a film forming component, a thixotropic filler and a plasticizer. The formulation exhibits fluidity, adhesive and plasticity characteristics which made the ink particularly suitable to imprint and form heat transferable labels by silk screen printing.

12 Claims, 3 Drawing Figures

HEAT TRANSFERABLE LABELS

This is a continuation in part of patent application Ser. No. 305,665 filed Sept. 25, 1981 now abandoned.

BACKGROUND OF THE INVENTION

I. Field of the Invention

The present invention relates to silk screen printing methods for imprinting labels carried on a web and the method of transferring the imprinted label to an article. The invention particularly relates to the silk screen printing of heat transferable labels carried on a web and to ink formulations for this purpose.

II. Description of the Prior Art

Heat transferable lables are typically composed of a paper backing overlaid with a release layer typically of wax in turn overprinted with an ink design. A heat transfer label of this type is disclosed in U.S. Pat. No. 3,616,015. Such labels are used to transfer an ink design image from a paper carrier web to the surface of an article, such as a container or bottle. In the transfer process the free side of the paper backing is first heated enough to melt the wax layer coating and tackify the ink design layer, and the label is then rolled or pressed onto the surface of the article so that the ink design makes contact with the article. The paper backing is then released from the molten wax release layer thus allowing transfer of the ink design to the surface of the article. The wax layer forms a protective coating over the ink design after the wax has dried. Heat transfer labels of this type may include other layers such as barrier layers between the ink layer and the release layer to improve the chemical resistance of the design image and/or to improve the release characteristics of the labels. The ink layer may also be overcoated with additional protective layers. Heat transfer labels of this type have received increasing use in industry for imprinting designs onto three-dimensional objects having varying degrees of smooth curvature and, in particular, for imprinting cylindrical articles. Additionally, these heat transfer type labels may be used to imprint designs on flat surfaces for a wide range of materials, including plastic, paper and glass.

Heat transfer labels of the type disclosed in U.S. Pat. No. 3,616,015 have heretofore been manufactured primarily by the use of rotogravure methods for imprinting the various layers including the wax release layer and ink layer onto the paper backing. In particular, it has been customary to coat the ink design layer by rotogravure technique even though the release wax layer may be coated by other methods, such as reverse roll coating techniques. The use of rotogravure for this purpose has been found to have serious economic disadvantages in the production of smaller quantities of heat transferable labels. The capital investment necessary for purchase and etching of a rotogravure cylinder far exceeds that required for purchase and preparation of an imprinted screen for use in the screen printing technique. Although it is more costly and time consuming to prepare a gravure cylinder than an imprinted silk screen, the gravure method is much faster than the silk screen method, once the gravure cylinder has been etched and is on line. Thus the gravure method has been found to be more advantageous for imprinting an ink design onto the release layer when large quantities of the heat transferable labels are to be manufactured using the same design, while there is a distinct economic advantage when employing the silk screen method for production of heat transferable labels in smaller quantities, e.g. less than 250,000 for small sized labels and under 5,000 for very large labels.

Despite the above-described advantages of silk screen printing methods for imprinting an ink design layer onto a release coated paper, such as a wax coated paper, it has heretofore been difficult to produce an ink formulation which is suitable for use in this particular application. The prior art discloses different types of ink formulations, typically conventional oil based or nitrocellulose based inks, as suitable in the silk screen process. The application of such conventional inks onto a wax coated paper backing to form a heat transferable label of the type disclosed in U.S. Pat. No. 3,616,015 presents the difficulties of satisfying an array of physical characteristics which are unique to this application. The silk screen type ink formulations disclosed in the prior art are typically made for application directly from the screen to the surface of either a flat substrate such as a woven or nonwoven material or directly to the surface of a three-dimensional article having smooth curves such as cylindrical objects. U.S. Pat. No. 3,109,365, for example, shows apparatus wherein designs are imprinted directly onto a cylindrical article by the use of a silk screen printing method. There are a number of inks which have been found suitable for the use in this type of conventional silk screen methods wherein the ink is transferred directly through the silk screen onto either a flat or three-dimensional object. Such inks typically may be either an oil-based type ink or a nitrocellulose base ink. Typical formulations are disclosed, for example, in E. A. Apps, *Ink Technology for Printers and Students*, Vol. 3 (1969), Chemical Publishing Co., Inc., pp. 37–48. Silk screen type inks which are applied directly to the article must have the properties such that the ink does not dry on the screen and does not physically break down upon agitation caused by motion of the squeegee.

When the ink is to be transferred to a release coating such as a wax release there are particular problems to be overcome such as providing the ink with sufficient adhesive bonding characteristics to the wax and yet allowing the ink to be sufficiently pliable and non-brittle after the ink has dried on the release surface. In addition, the ink must have suitable flow characteristics to be squeegeed through the silk screen onto the wax coated paper which forms the release substrate for the heat transferable label. The ink must have exceptional contact characteristics as well as adhesion characteristics so that the ink will lay down smoothly and adhere to the wax surface yet remain flexible and non-brittle upon evaporation of solvents contained in the ink. In addition, the ink must have exceptional adhesive and plastic properties to permit transfer of the ink from the web to an article upon application of heat and pressure. The ink layers for this application should be relatively thick as compared with gravure printing ink layers. When imprinting an ink design onto heat transferable labels it is in fact sometimes desirable to have thicker ink designs than those which are conventionally used when the ink is transferred directly from silk screen to an article. Thus, the present ink formulation must also permit imprinting of thicker designs.

Accordingly, it is an object of the present invention to provide a continuous silk screen process for use in the production of heat transferable labels. Of particular interest is the printing of an ink design onto a release substrate such as a wax coated paper web.

It is another object of the present invention to provide ink formulations which simultaneously exhibit the above-listed array of physical characteristics which make the ink particularly suitable for use in the screen printing of heat transferable labels.

SUMMARY OF THE INVENTION

In accomplishing the foregoing and related objects, the process of the invention is implemented using a conveyor section, a screen printing section and a drying section. The process of the invention accomplishes a continuous screen printing of ink designs onto label substrates composed of a release coated web such as a wax coated web, typically of paper, to produce imprinted labels which are heat transferable from the web to a nonfibrous article. The invention also encompasses a product incorporating a novel printing ink formulation specially adapted for the screen printing of a design onto a release coated web to form imprinted heat transferable labels.

The preferred ink formulations of the invention simultaneously exhibit an array of flow and adhesive characteristics which permit their use in a screen printing process for imprinting release coated substrates such as a wax coated paper web. In addition, the ink exhibits exceptional adhesive and plastic properties suitable for transfer of the ink design from the web upon application of heat and pressure. The ink has the additional properties that it produces a sharp image, remains in permanent adhesive contact with the article and does not peel or chip upon prolonged contact.

In the process of the invention the web is fed continuously to the screen printing section wherein an ink design is imprinted onto a preprinted release layer of each one of the label areas. The screen printing section includes a squeegee which forces the ink through permeable areas of the screen and onto each one of the label areas as the web is passed beneath the screen.

In the preferred embodiment of the invention a web (typically a paper sheet) precoated over distinct areas with a release coating is provided as an input to the process. The release layer may be coated onto the web uniformly by use of the reverse roll or rotogravure method or may be coated onto the web uniformly or in patches by use of the screen printing process of the present invention. The coated areas of the web form substrates typically positioned in a periodically spaced arrangement and aligned into one or more rows. The release coating may consist of one or more layers but typically is composed of one coating containing a release wax such as montan wax. A squeegee is operated to force the ink through the permeable areas of the screen.

In illustrative screen printing apparatus, the conveyor system is provided with an automated mechanism for halting the passage of the web at intervals of sufficient duration to permit the squeegee to complete at least one print stroke along the length of the screen. As each print stroke is completed the conveyor is automatically advanced by a conventional indexing mechanism so that another set of substrates on the web appears beneath the screen and the printing process is repeated.

After printing the web containing the imprinted substrates is passed to a dryer, preferably an infrared dryer operating at about 150° to 160° F. and power of about 1500 watts per sq. ft. of drying area. The imprinted substrates preferably have a residence time in the dryer of about 1 to 3 seconds. The dried web passes from the drying section to a storage reel optionally after slitting, punching, or similar operations.

Alternatively, prior to storage after the web passes from the drying section it may be routed to other screen printing and drying sections arranged in series to permit imprinting of a different colored design overlayed onto the printed substrates, thus producing a multicolored print design.

The printed web is then passed to a transfer section wherein the printed web is applied to a glass, plastic or metal article with the ink design in contact with the article while a hot platen is applied to the web. The ink design becomes permanently fixed to the article and the web separable therefrom. The imprinted article may be subjected to further heating to enhance the gloss characteristics of the transferred ink design. The dwell time during which the ink design is subjected to external heat during both transfer to the article and any subsequent heat treating is very brief and totals less than one or two seconds.

The composite ink formulation of the invention is made up of a base ink vehicle, a plasticizer, filler and solvents. The base ink vehicle is composed of a resin binder, pigment and binder solvents. Preferably, the resin binder is composed of a nitrocellulose film forming component and a thermoplastic polyamide resin component. The polyamide resin component is preferably selected from the thermoplastic class of polyamides formed of the reaction product of a diamine and dimerized fatty acid. A preferred polyamide is formed of the reaction product of a diamine and a dimerized ethylenically unsaturated fatty acid such as the reaction product of ethylene diamine and dimerized linoleic acid. The binder solvents may be selected from the group of solvents compatible with the resin binder components; however, preferred solvents for the indicated resin binder have been determined to include butyl cellosolve (ethylene glycol monobutyl ether) and amyl alcohol. Alternatively, instead of amyl alcohol, aliphatic alcohols ranging from $C_4$ to $C_7$ may be used. The pigments are conventional and may typically include carbon, any conventional compatible pigments such as carbon black (black), titanium oxide (white) or iron blue (blue), which may be selected depending on the color desired.

The resin binder preferably comprises between about 25 to 50 percent by weight of the base ink vehicle (wet) and the ratio of the polyamide resin to nitrocellulose film forming component may be in a range from about 3/1 to 5/1. Preferably the weight ratio of total solids (resin binder plus pigment) to solvent in the base ink vehicle is in the range between about 0.5/1 to 2/1. The lower end of the range is generally desirable for colors such as black, blue or red and the higher end of the range more desirable for white and yellow.

The composite ink formulation of the invention consists of the base ink vehicle, plasticizer filler and may include additional solvent. The filler preferably is a thixotropic agent such as a nonhygroscopic organic derivative of castor oil, but may include inorganic thixotropic agents such as montorilionite clay, or fumed silicon dioxide.

The plasticizer preferably is selected from the sulfonamide chemical class. It has been determined that plasticizers selected from the toluene sulfonamide class, more preferably n-ethyl O, P toluene sulfonamide plasticizers produce advantageous results. This latter plasticizer is available under the tradename SANTICIZER 8 from Monsanto Co. of St. Louis, Mo. Another suitable plasticizer is a toluene sulphonamideformaldehyde resin available under the tradename SANTOLITE MHP or SANTOLITE MS-80% from Monsanto Co. of St. Louis, Mo. The dried ink is composed preferably of 30 to 70 percent by weight of resin binder, between about 15 to 35 percent by weight filler plus plasticizer and between about 8 to 50 percent by weight pigments. The weight ratio of filler to plasticizer is preferably in a range between about 1/1 to 2.5/1. The screen printing ink before drying is composed of between about 15 to 30 percent by weight resin binder and 10 to 15 percent by weight of plasticizer plus filler.

It has been determined that the ink formulation of the present invention satisifies a demanding range of physical requirements found to be necessary to make the ink suitable for screen printing onto a release coated substrate to form an imprinted heat transferable label. The ink formulation of the invention not only exhibits flow and adhesive charactertistics necessary for silk screen imprinting of a design onto a release coated web, but also exhibits exceptional adhesive properties when the ink design is subsequently heat transferred from the carrier web onto an article. Additionally the ink formulation has enhanced pliability when dry so that a crips, sharp image is obtained with the ink not prone to chipping or peeling even with ink thicknesses as high as 0.6 to 1.0 mil and even slightly higher.

DESCRIPTION OF THE FIGURES

Other aspects of the process of the invention will become more apparent when viewed in conjunction with the figures.

DETAILED DESCRIPTION

Figure 1:
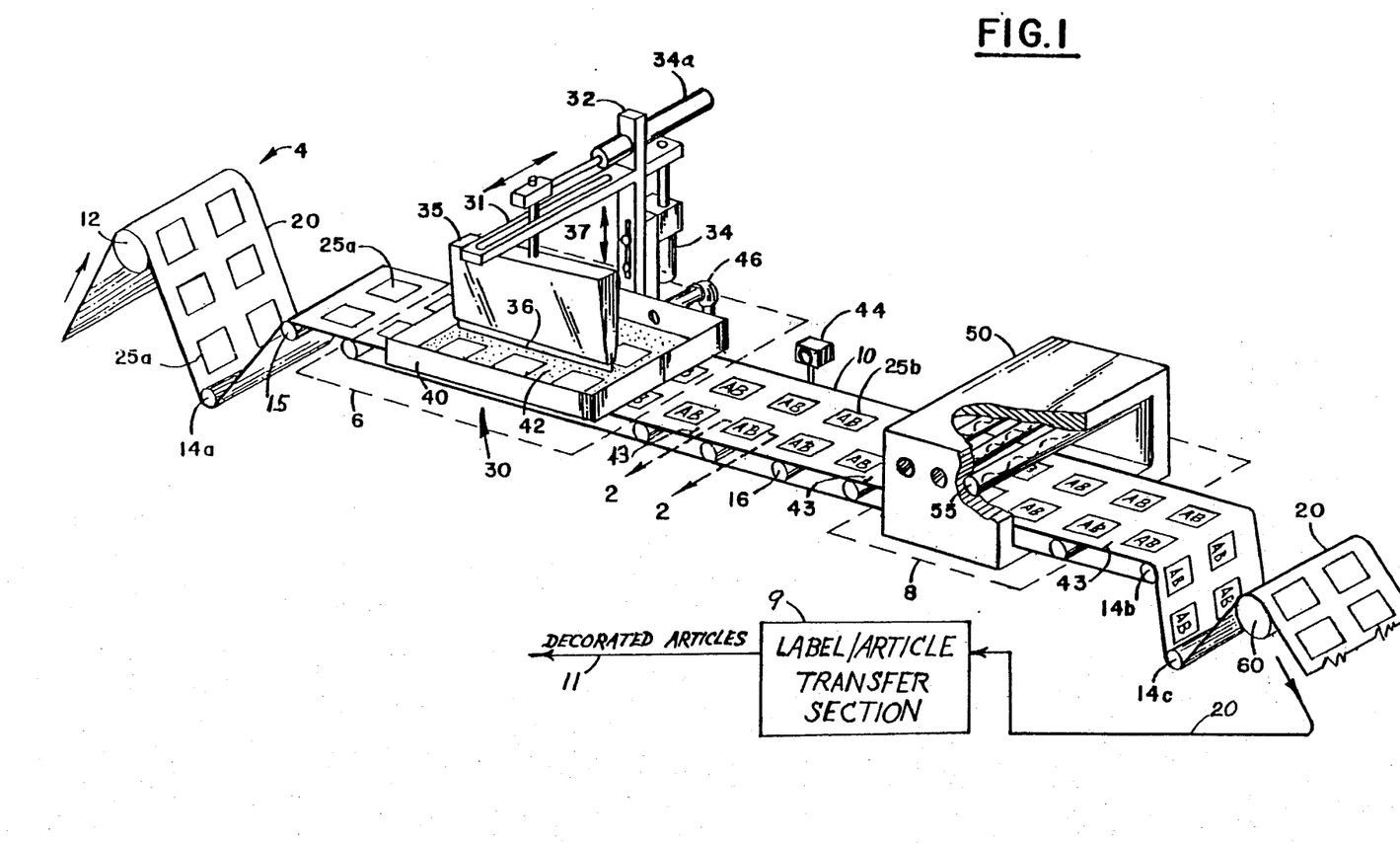
FIG. 1 is a flow schematic illustrating the processing sequence of the invention.

The process of the invention as illustrated in FIG. 1 includes a conveying system 4, a screen printing section 6 and a drying section 8 and label/article transfer section 9. The screen printing section 6 is composed of a screen assembly 30 which includes a frame 40 and screen 42 with designs or lettering 45 imprinted thereon. The screen printing section 6 also includes a squeegee assemly 31 composed of a squeegee arm 32 and squeegee 35 held in place against screen 42 by arm 32. The drying section includes an oven 50 for drying the ink imprinted laminates 25b emerging from screen printing section 6. Conveying system 4 consists of a conveyor 10, unwind and rewind calendars 12 and 60 respectively, various dancer and idler rolls (not shown), and web registration apparatus. The web registration apparatus advantageously includes a guide roll 15 for providing a predetermined transverse positioning of the web 20 prior to passage thru screen printing assembly 6. Additionally, conveyor system 4 is provided with an electric eye 44 located along conveyor 10 immediately after screen printing section 6. Electric eye 44 is adapted to sense registration marks 43 intermittently spaced along the length of web 20. Registration marks 43 are advantageously spaced at distances approximately equal to the length of screen printing section 6. In operation of this indexing apparatus, after completion of a printing cycle, web 20 is indexed a distance typically between 15 to 20 inches. The web 20 is indexed over a distance slightly less than the spacing of registration marks 43 (e.g. 19.8 inches for a mark spacing of 20 inches). The web is then advanced over increments by a stepping motor (not shown) until electric eye 44 detects the next mark 43. The printing step is effected during the dwell in web advance.

Web 20 has superimposed thereon one or more release coating layers spaced apart intermittently along the length and width of web 20 to form substrates 25A. Alternatively, the apparatus may include an additional preliminary printing station 2 for laying down the desired pattern of release coated layers.

Figure 2:
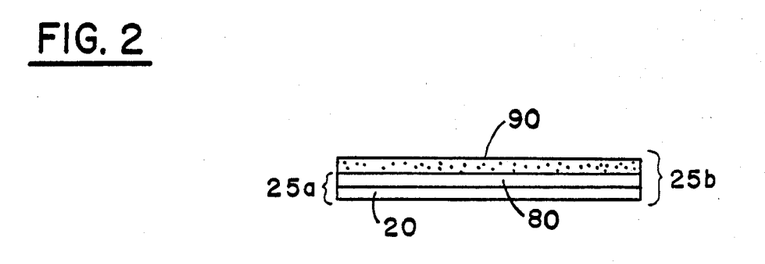
FIG. 2 is a cross sectional view of a printed laminate taken through lines 2—2 of FIG. 1.

The substrates 25A as best shown in FIG. 2 are composed typically of the paper web base 20 overcoated with a wax release layer 80, advantageously a montan wax. Alternatively, release layer 80 may typically be a wax composed of polyethylene and a high melting paraffin. The polyethylene may include an oxidized polyethylene and the refined high melting paraffin is preferably a straight chain paraffin having a melting point above about 150° F. Alternatively, the release layer may be a thermoplastic film preferably of polypropylene. Other release layer compositions may be suitable, for example ultraviolet or electron beam cured polymer release coatings. Substrate 25A may contain additional polymeric coatings either between wax layer 80 and the paper web base or layers forming a barrier coating over wax layer 80. A montan wax such as that referenced in U.S. Pat. No. 3,616,015 is preferred for release layer 80. An alternative release layer comprises a wax composed of a blend of polyethylene and high melting paraffin having a melting point about 150° F. may be employed instead of montan wax. Also the release layer 80 may include other waxes or may be a thermoplastic film preferably of crystalline polypropylene. Substrates 25A may be of any size or shape; typically they may range from fractions of an inch to several inches in length and width. Substrates 25A are arranged illustratively in rows which are uniformly spaced apart. Depending on the size of the substrates, two or three or more substrates may be aligned in spaced apart arrangement along the width of web 20. Web 20 is not restricted to any particular size width; for example, it typically could have a width between 5 to 60 inches.

Ink layer 90 may contain any type of lettering or design which is screen printed onto substrate 25A to form printed laminates 25B. The printed laminates 25B form heat transferrable labels for imprinting articles such as three-dimensional bottles and containers with the ink design. Transfer of ink design layer 90 from printed laminate 25B to an article is accomplished in label/article transfer section 9 to produce decorated articles 11. In the label/article transfer section, the ink design layer 90 is transferred to the article or bottle typically by rolling pressure from a conventional heated surface such as a heated platen or hot roller which presses against the exposed surface of paper web 20, while design layer 90 of transferable laminate 25B is in contact with the receiving article. The hot platen or roller is heated to a temperature sufficient to tackify ink layer 90 and sufficient to melt release 80 if it is a wax-based release. The platen or roller is thus heated to a temperature between about 300° F. to 600° F., preferably about 300° F. to 420° F. The contact time of the heated platen on substrate 25A as the transferable laminate 25B is pressed against the receiving article is less than one or two seconds, and typically about 0.1 second. Paper base web 20 is then removed from release layer 80 and ink design layer 90, coated with release layer 80, remains in permanent contact with the article forming a transferred image on the article.

After ink layer 90 has been transferred onto the receiving article, it may optionally be subjected to a postheating or postflaming step. This step, although optional, is preferably employed to enhance the appearance of the transferred image 90 on the receiving article. In the postflaming step, the transferred ink layer 90, including transferred wax release layer 80 is typically exposed to jets of hot gas, either as a direct gas flame or hot air jets for a brief period. Hot air, hot gas, or infrared heating between about 400° F. to about 3,000° F. may be employed in this step, but combusted gas having flame temperatures between about 1,000° F. and 3,000° F. is preferred. It is preferable to use a direct flame of combusted natural gas, propane, or methane, typically having a flame temperature of about 2,000° F. It has been determined that the postflaming step need only be of at most several seconds duration, preferably less than about one or two seconds, and is typically less than 0.15 second when a flame temperature between about 1,000° F. and 3,000° F. is employed. The period of time is sufficient to melt transferred wax release layer 80 and thereby improve its gloss characteristic, yet without causing surface distortion to the article. The postflaming step may be carried out in the manner set forth in U.S. Pat. No. 3,616,015.

Figure 3:
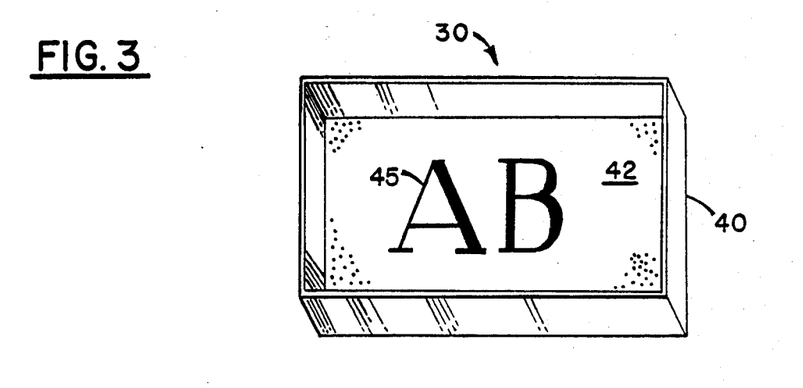
FIG. 3 is a planar view of the silk screen assembly.

Screen printing section 6 consists of a screen assembly 30 and a squeegee assembly 31. Screen assembly 30 consists of a frame 40 and screen 42 preferably composed of a polyester screen mesh. Screen 42 is prepared by conventional silk screen processing methods to leave superimposed thereon any desired lettering or design. The space occupied by the design is permeable to the screen ink formulation of the invention whereas the remaining area of silk screen 42 is treated by conventional methods to block the porous structure of screen 42 such that all of the remaining area is impervious to the flow of ink.

Squeegee assembly 31 consists of a squeegee arm 32 housing a squeegee 35. Squeegee 35 is preferably pneumatically actuated, and squeegee arm 32 is activated by conventional motorized means. As the squeegee 35 is passed in one stroke along the width of the screen 42, the pressure exerted by squeegee blade 36 onto screen 42 must be sufficient to force ink through a screen mesh 42 along the lettering and design areas within screen 42. After each print stroke, additional ink is supplied through flood bar 46 to replenish the supply of ink consumed in the printing process.

In operation the pneumatically actuated squeegee 35 exerts a pressure preferably up to about 50 to 75 psi on the screen 42. Squeegee blade 36 may be comprised preferably of hard rubber or urethane material. Advantageous materials for use with the ink formulation of the present invention include nylon, polyester or stainless steel having a mesh size between about 160 to 380 mesh, typically between about 300 to 325 mesh. The print stroke traverses the width of screen 42, which is typically a fixed width of about 15 inches, in a period typically of about 0.4 to 0.8 seconds. It has been found advantageous to position the screen 42 approximately 3/8 to ½ inch above web 20. During the printing cycle the pneumatic pressure exerted onto squeegee 35 forces down the screen 42 to contact substrates 25A on web 20. As contact is made squeegee 35 forces the printing ink through the permeable design spaces 45 within screen 42, thus imprinting the desired design onto substrates 25A.

Dryer 50 may be a convective type dryer; however, it has been found preferable to employ an infrared dryer. It has been determined that use of an infrared dryer, particularly a dryer employing a nichrome filament 55 operating under a power of 1,500 watts per sq. ft. of drying area is preferable. Dryer 50 is preferably operated at a temperature in the range of 150° to 160° F. The use of infrared drying operating in this temperature range permits a much shorter drying time and therefore is preferred over convective drying.

The web passes through the dryer preferably at an average speed between about 50 ft./minute to 100 ft./minute, typically 75 ft./minute. When infrared drying is employed under the aforementioned conditions, it has been found that the required drying time is on the order of about 1.2 to 2.4 seconds, thus permitting use of a drying section between about 1 to 4 ft. in length. This results in a more contact drying unit and considerably lessens the investment cost for dryer 50. Preferably dryer 50 incorporates an open resistance heating element such as a nichrome filament. This permits infrared heating while keeping the temperature of the dryer at low enough levels to dry the ink quickly but not cause melting of the wax layer.

The process of the invention may be extended to printing laminates 25B having designs composed of a multiplicity of colors. This may be accomplished by providing a series of screen printing sections 6 and drying stations 8. In this embodiment, the first printing section 6 may print a design of a particular color to form printed laminate 25b and additional printing sections can be adapted to overlay designs of different colors. It would be preferable to locate a drying section in between each of the serially arranged printing sections 6. Alternatively, the web can be run along a multiple path on the same screen wherein the substrates would be exposed to a different color ink and a different imprint design on each one of the multiple paths. When employing multiple colors registration and indexing of the web should be controlled to plus or minus 0.002 inch along the axis of travel and the lateral accuracy should be controlled to within a tolerance of plus or minus 0.004 inch.

The ink formulation of the invention for use in screen printing section 6 must meet a number of physical characteristics simultaneously since the ink is applied to a release layer such as a wax coated substrate 25A. Ink applied to the release layer 80 must exhibit suitable adhesion properties and yet not contain components that would retard the flow of the ink through the screen 42. The ink must be pliable upon drying even though a relatively thick ink layer is laid down on substrate 25A. It is desirable that ink layer 90 be about 1 to 1.5 mil. in thickness when wet or about 0.4 to 0.6 mil. or up to about 1 mil and even slightly higher dry. This has been found to be a particularly suitable ink thickness for use in the application of heat transfer labelling processes. Thinner ink coating layers may require overcoating or else may be inappropriate for application to many types of articles. Furthermore, the ink must exhibit sufficient flow characteristics and contact properties such that it will adhere uniformly to the release layer and not cause flow out leakage or bleeding. If the ink is too thin, bleeding can occur, resulting in an image which is not crisp and clear. The ink must be sufficiently adhesive not only to adhere to the release layer 80 but importantly to adhere to a nonfibrous article such as a plastic, metal or glass container when the printed laminated 25B of the invention is transferred to an article in heat transfer labelling section 9.

The ink formulation must permit rapid transfer of ink layer 90 to an article upon application of heat, typically by a hot platen applied with pressure to substrate 25A upon contact of ink layer 90 to the article. Prior to transfer of ink layer 90 onto the article it is preferable to preheat the laminates 25B to a temperature less than the temperature at which transfer onto the article occurs, by passing web 20 with laminates 25B intact over a hot, flat platen maintained at a temperature preferably less than 400° F., more preferably maintained at a temperature between about 150° to 220° F. The dwell time in which laminates 25B are exposed to preheat is less than about 10 seconds, typically less than about 2 to 4 seconds.

After preheating laminates 25B, web 20 with laminates 25B intact are passed over the surface of the articles to be decorated and then pressed onto the article's surface by the pressure of a hot applicator platen or heated applicator roller. The hot applicator platen presses against the exposed surface of substrate 25A and forces ink design layer 90 into contact with a surface of the article. The dwell time of the hot applicator platen in contact with substrate 25A is less than one or two seconds, typically only a fraction of a second. The total dwell time during which ink layer 90 is subjected to an external heat source during transfer of the ink design 90 to the article by the hot applicator platen, and in heating in any time thereafter as in postflaming treatment, is less than aout several seconds, preferably less than about one or two seconds.

Higher heating dwell times are a disadvantage in mass-production since it complicates the transfer process and makes it difficult to attain a high rate of transferred print layers 90 onto the articles being decorated. In order to obtain a total dwell time of less than a few seconds, the ink formulation of the present invention essentially does not polymerize during transfer or thereafter. Therefore, the present ink formulation does not include cross-linking agents and likewise does not include catalysts. Cross-linking agents, which are typically employed in prior art heat transferable inks, (as for example in U.S. Pat. No. 4,315,790, Rattee et al.) impose a curing requirement, that is, a heating step of sufficient duration to accomplish the cross-linking. The curing requirement is disadvantageous because it lengthens the time that the ink layer must be subjected to elevated temperature during transfer and/or in subsequent heating or postflaming steps to total dwell times greatly in excess of several seconds, and typically totalling 1 to 1.5 minutes.

Applicants have found that conventional screen printing formulations available commercially are unsuitable to meet the very strict combination of requirements that the present formulation must satisfy. In addition to meeting the aforementioned requirements, the ink must have the property that it does not significantly evaporate while in the screen but will readily dry when the imprinted labels are passed through drying section 8. This latter requirement places a constraint on the amount and type of solvent which can be added to the ink mixture.

The composite ink formulation of the invention is composed of a base ink vehicle to which a plasticizer and thixotropic agent is added. Additional solvents may be added to the base ink vehicle. The base ink vehicle is comprised preferably of a resin binder, a conventional pigment, and solvents. The resin binder preferably includes a thermoplastic polyamide adhesive resin.

The polyamide adhesive resins determined to be particularly suitable are thermoplastic adhesive resins formed by the reaction product of dimerized fatty acids and diamines. The polyamide resin is essentially formed of the condensation reaction product of dimerized fatty acids and diamines. The polyamide resin formed from this reaction is a solid at ambient temperature and exhibits relatively sharp softening points.

Dimerization of fatty acids may be accomplished employing conventional methods such as thermal dimerization of clay-catalyzed dimerization methods. Conventional methods suitable for preparing dimerized fatty acids are referenced in Everett H. Pryde, Editor, "Fatty Acids," *American Oil Chemists' Society*, Champaign, Ill. (1979), Ch. 17, p. 343–352.

The preferred dimerized fatty acid is a dimerized ethylenically unsaturated fatty acid, preferably dimerized linoleic acid or dimerized oleic acid. The diamine is typically ethylene diamine or hexamethylene diamine. A wide range of diamines may be employed. Preferred diamines are molecules with amine end groups and one or more alkyl groups having a carbon content from $C_2$ to $C_6$, preferably one alkyl group having a carbon content from $C_2$ to $C_6$.

Suitable ethylenically unsaturated fatty acids from which the dimerized fatty acid may be foremd may be selected from a wide array of monounsaturated, diunsaturated, triunsaturated, tetraunsaturated, and polyunsaturated fatty acid monomers which illustratively includes cetoleic acid, elaidic acid, eicosatetraenoic acid, gadoleic acid, hiroagonic acid, linoleic acid, linolenic acid, linderic acid, myristoleic acid, moroctic acid, oleic acid, palmitoleic acid, petroselinic acid, tsuzuic acid, and vaccenic acid. Fatty acids of this type for reaction with diamines are referenced in British Pat. No. 991,514.

The dimerized fatty acid may also be formed from dimerized saturated or dimerized acetylenically unsaturated fatty acid monomers, however, saturated fatty acid monomers are more difficult to polymerize and therfore are less preferred than ethylenically unsaturated fatty acids. Typical saturated fatty acid monomers may include caprylic acid, behenic acid, capric acid, lauric acid, myristic acid, palmitic acid, stearic acid, and lignoceric acid. Acetylenically unsaturated fatty acid monomers, while easily polymerizeable, do not often occur in natural fatty acids, and therefore have the disadvantage that they must be prepared synthetically; they are therefore not preferred.

The preferred polyamide resin formed by the reaction product of a dimerized fatty acid and diamine has a Ball and Ring softening point between about 85°–200° C. These resins are solid at ambient temperature and are not liquid reactive polyamides. The Ball and Ring softening point of the polyamide resin is more particularly between about 90°–120° C. A preferred, commercially available grade of polyamide resin of the above-described class, which is formed by the reaction product of a dimerized fatty acid and diamine, is available under the VERSAMID® series of solid polyamide resins available from Henkel Corp. of Minneapolis, MN. The VERSAMID® series of resins has a softening point typically between 85°–120° C., and may be as high as about 200° C. Although any of the VERSAMID ® solid thermoplastic resins may be employed in the ink vehicle of the invention, a particularly suitable polyamide within the VERSAMID ® series is VERSAMID 930, which has a Ball and Ring softening point between about 105°–115° C., and a Brookfield viscosity of about 21–27 poise at 160° C.

Polyamide adhesive resins of the above-described class which are principally the reaction product of a dimerized fatty acid and diamine may also be selected from the MACROMELT series of hot melt polyamide resins from Henkel Corporation of Minneapolis, MN. The MACROMELT series are generally of higher molecular weight. The MACROMELT series of solid thermoplastic polyamide resins have a Ball and Ring softening point typically between about 90°–165° C., and the softening point may be as high as about 200° C. Although any one of the polyamide resins from the MACROMELT series may be used in the ink vehicle formulation, a particularly suitable polyamide is MACROMELT 6200. This latter polyamide resin has a Ball and Ring softening point of about 98°–112° C. and a viscosity of about 25–45 poise at 210° C. British Pat. No. 991,514 is illustrative of a method of preparation of polyamide from the above class, resulting from reaction of dimerized fatty acid and diamine.

The resin binder may include a conventional film-forming component suitable for use in ink vehicles. A suitable film-forming component is nitrocellulose film having an average nitrogen content of between about 11.8 to 12.1 percent and a viscosity preferably between about ¼ to 175 seconds more preferably 125 to 175 seconds as measured under procedure ASTM D-301-72. The preferred solvents in the base ink vehicle are butylcellosolve (ethylene glycol monobutyl ether) for solvent (i) and amyl alcohol for solvent (ii). Alternatively, solvent (ii) may be composed of aliphatic alcohols ranging from $C_4$ to $C_7$ including amyl alcohol and mixtures thereof. Also solvent (i) may be composed of CELLOSOLVE (ethylene glycol monoethyl ether), CARBITOL (diethylene glycol monoethyl ether) and butyl CARBITOL (diethylene glycol monobutyl ether) or methyl CARBITOL (diethylene glycol mono methyl ether) alone or in mixtures thereof with or without butyl CELLOSOLVE. An advantageous thermoplastic polyamide adhesive resin for use in the resin binder of the base ink vehicle is a thermoplastic type polyamide available under the trademade VERSAMID-930 manufactured by Henkel Corp. Co. of Minneapolis, Minn.

A preferred plasticizer is a toluene sulfonamide, more preferably n-ethyl O, P toluene sulfonamide. A plasticizer of this type is available under the tradename SANTICIZER-8 available from Monsanto Co. of St. Louis, Mo. The thixotropic additive is preferably a nondiscoloring, nonhygroscopic organic derivative of castor oil. A thixotropic agent of this latter type is available under the tradename THIXCIN-R from NL Industries of Highstown, N.J. Another suitable nonhygroscopic thixotropic agent is available under the tradename THIXTROL ST from NL Industries. This latter thixotropic agent is also an organic derivative of castor oil which may be modified with inorganic materials to enhance dispersion. Alternatively, the thixotropic agent may include inorganic materials such as montmorillonite clay available under the trademark BENTONE 128 from NL Industries. When a matte finish is particularly desirable for the printing ink, a fume silicon dioxide thixotropic agent may be used such as that available under the trademark CAB-O-SIL from Cabot Corp., of Boston, Mass.

The preferred formulation for the composite ink of the invention is presented in Table 1. Composite ink formulations are tabulated in Table 1 for a black pigmented ink under column I and a white pigmented ink under column II. The preferred composition of the base ink vehicle is tabulated in Table 2A. The composition of base ink vehicle I (black) and base ink vehicle II (white) shown tabulated in Table 2A are the preferred compositions for the base ink vehicle to be used in the composite ink formulations I and II respectively, listed in Table 1.

The composition of the composite formulation shown in Table 1 may be used irrespective of the color ink desired. However, the percent by weight of total solids (i.e. resin plus pigment) and the amount of pigment can vary for different colored inks. The amount of total solids content (i.e. resin plus pigment, weight percent) in the base ink vehicle for any color ink can vary preferably between the amounts shown in Table 2A for the black formulation I and white formulation II.

Also, the amount of pigment in the base ink vehicle for any color ink may vary preferably between the amounts shown in Table 2A for the black and white formulations. Black ink typically has the least amount of pigment, white the greatest amount, and red and blue typically very close to one another, with amounts typically between that shown in Table 2A for the black and white formulations.

Table 2B is a tabulation of the composition of the formulation I (black) and formulation II (white) of Table 1 after the ink has been dried and all the solvents have evaporated. It has been determined that the incorporation of a toluene sulfonamide plasticizer such as SANTICIZER-8 produces a dried ink coating which is flexible and not brittle. The use of this plasticizer also allows for a more uniform contact and adhesion between the ink and wax release coating layer 80 even when coating the wax layer with ink having a dried thickness up to about 0.4 to 0.6 mils and as high as about 1 mil. The use of plasticizer alone tends to increase the ink flowability which is an undesirable characteristic for use in the present silk screen process application. Applicants have determined that addition of a thixotropic agent, preferably THIXCIN-R, counteracts this undesirable characteristic by giving the ink formulation a paste-like flow consistency so that the printed images are crisp and sharp and do not exhibit leaking or bleeding of ink around the image outline. It has been determined that there must be a proper balance between the use of the thixotropic agent and plasticizer in order to achieve the desirable physical characteristics. If insufficient plasticizer is used, the adhesive bond between the ink coating and the release layer 80 will not be as good and the dried ink will tend to be brittle and chip away during handling of the heat transfer label. On the other hand, use of too much or too little thixotropic agent in combination with the plasticizer will result in an ink formulation having undesirable flow properties for use in connection with the silk screen processing application of the present invention.

TABLE 1

Composite Ink Formulation

| | Formulation | |
|---|---|---|
| | I<br>Black<br>Comp. Wt. %[1] | II<br>White<br>Comp. Wt. %[2] |
| Base Ink Vehicle | 69.3 | 69.3 |
| Plasticizer<br>(e.g. n-ethyl, p toluene sulfonamide) | 4.2 | 4.2 |
| Filler<br>(e.g. THIXCIN-R) | 5.5 | 5.5 |
| Solvent<br>(e.g. ethylene glycol mono-butyl ether) | 21.0 | 21.0 |
| | 100.0 | 100.0 |

Notes:
[1] Based on Base Ink Vehicle I (Table 2A)
[2] Based on Base Ink Vehicle II (Table 2A)

TABLE 2A

Composition of Base Ink Vehicle

| | Base Ink<br>Vehicle I<br>Black<br>Comp. Wt. % | Base Ink<br>Vehicle II<br>White<br>Comp. Wt. % |
|---|---|---|
| Resin Binder: | | |
| (a) Film Forming Component | 8.3 | 5.3 |
| (b) Thermoplastic Polyamide Adhesive Resin (e.g. VERSAMID 930) | 33.3 | 21.2 |
| Pigment: | | |
| (e.g. carbon black, Vehicle I; $TiO_2$ - Vehicle II) | 4.9 | 40.8 |
| Solvents: | | |
| (i) ethylene glycol mono-butyl ether | 7.6 | 5.5 |
| (ii) amyl alcohol (mixed primary isomers) | 45.9 | 27.2 |
| | 100.0 | 100.0 |

TABLE 2B

Dried Ink Composition

| | Formulation | |
|---|---|---|
| | I<br>Black<br>Comp. Wt. % | II<br>White<br>Comp. Wt. % |
| Resin Binder | | |
| (a) Film Forming Component (e.g. nitrocellulose) | 13.8 | 6.5 |
| (b) Thermoplastic Polyamide Adhesive Resin (e.g. VERSAMID 930) | 55.0 | 26.2 |
| Pigment | | |
| (e.g. carbon black - I; $TiO_2$ - II) | 8.2 | 50.2 |
| Plasticizer: | | |
| (e.g. n-ethyl, p toluene sulfonamide) | 9.9 | 7.4 |
| Filler: | | |
| (e.g. THIXCIN-R) | 13.1 | 9.7 |
| | 100.00 | 100.00 |

A method of preparing the heat formulation of the invention is set forth in the following non-limiting examples:

EXAMPLE I

A black pigmented formulation is prepared in accordance with the compositions set forth for Formulation I (black) in Table 1 by admixing 69.3 parts by weight of base ink vehicle I in an open type vessel with 4.2 parts by weight of plasticizer SANTICIZER-8. The composition of base ink vehicle I is shown in Table 2A. The mixture of base ink vehicle I and the plasticizer is stirred with the conventional type explosion proof electrical mixer or with air mixers operating initially at the speed of about 1,000 rpm. The mixture is stirred at ambient conditions for a few seconds to achieve an intitial blending of the base ink vehicle I and the plasticizer. Subsequently, about 5.5 parts by weight of the filler THIXCIN-R is gradually added while simultaneously gradually increasing the mixing speed to about 2,400 rpm. over a period of less than about one minute. At this time about 21 parts by weight of butyl-cellosolve is slowly added to the mixer. The mixture is continually stirred at ambient conditions and at mixing speeds of about 2,400 rpm. for a period of about 20 to 30 minutes. The mixing is continued until the blend thickens to form a homogenous physical mixture. The homogeneous mixture is allowed to cool to about ambient temperature prior to use in the screen printing process.

The white pigment formulation II may be prepared in the same manner except that the ingredients should be added in accordance with the composition by weight set forth under Formulation II (white) presented in Table 1.

Other colors of ink may be prepared in the same manner under the same mixing conditions by using the formulations under I and II of Table 1, except that suitable quantities of conventional pigments of the appropriate color are substituted within the base vehicle so as to produce the desired colored ink. The base ink vehicle is prepared conventionally by admixing the components listed in Table 2A until a homogeneous physical mixture is achieved. The mixing may be accomplished under ambient conditions in using conventional explosion proof electrical mixing apparatus, air mixers, or three roll mill mixers.

It will be appreciated that other variations of the process and ink formulation of the invention set forth in the description are possible without departing from the spirit and scope of the invention. The invention is therefore not intended to be limited to the description in this specification but only by the claims and equivalents thereof.

We claim:

1. A method of transferring an ink design layer, which comprises the steps of:
   (a) depositing a release layer onto a carrier web,
   (b) screen imprinting over said release layer an ink design layer comprising a screen printing ink, said screen printing ink comprising a base ink vehicle comprised of a resin binder plus pigment, said resin binder comprising a polyamide resin comprised of the reaction product of a diamine and dimerized fatty acid, said ink not comprising a cross-linking agent and said ink being heat transferable from the web to a surface of a receiving article, said article comprised of a nonfibrous material selected from the group consisting of plastic, metal and glass, said ink design layer being sufficiently adhesive to bond to the article upon application of heat and pressure to effect transfer of the ink design layer from the web to said article,
   (c) drying the imprinted web so as to dry the ink design layer but not melt the release layer, and
   (d) transferring the ink design layer from the carrier web to said article by applying the ink design layer substantially in pressure contact with a surface of the article and simultaneously applying sufficient external heat to the carrier web for a period of less than about two seconds so that the ink layer becomes tacky and the carrier web separable from the transferred ink design layer and subsequently postheat treating the transferred ink design on the article by exposing the transferred ink design on the article to an external heat source having a temperature between about 400° F. to about 3,000° F. for a period of less than about two seconds.

2. A method as in claim 1 wherein the drying step comprises exposing the imprinted web to infrared radiation and the drying time is between about 1.2 to 2.4 seconds.

3. A method as in claim 1 wherein the screen printing ink is further comprised of a plasticizer and filler.

4. A method as in claim 1 wherein the dimerized fatty acid comprises a dimerized ethylenically unsaturated fatty acid.

5. A method as in claim 1 wherein the resin binder in said base ink vehicle comprises between about 25 to 50 percent by weight of the base ink vehicle before drying.

6. A method as in claim 3 wherein the filler in said screen printing ink is a thixotropic agent.

7. A method as in claim 6 wherein the thixotropic agent is a nonhygroscopic organic derivative of castor oil.

8. A method as in claim 6 wherein the thixotropic agent is selected from the inorganic class consisting of montmorillonite clay and fumed silicon dioxide.

9. A method as in claim 1 further comprising the step of passing the dried imprinted web to a second screen printing and drying section arranged serially after said first drying section to imprint and dry sequentially an ink design of different color on said imprinted web to produce laminates having a multicolored design imprinted thereon.

10. A method for transferring an ink design layer, which comprises the steps of:
    (a) depositing a release layer onto a carrier web,
    (b) screen imprinting over said release layer an ink design layer comprising a screen printing ink, said ink not comprising a cross-linking agent and said ink being heat transferable from the web to a surface of a receiving article said article comprised of a nonfibrous material selected from the group consisting of plastic, metal and glass, said ink design layer being sufficiently adhesive to bond to the article upon application of heat and pressure to effect transfer of the ink design layer from the web to said article,
    (c) drying the imprinted web so as to dry the ink design layer but not melt the release layer, and
    (d) transferring the ink design layer from the carrier web to said article by applying the ink design layer substantially in pressure contact with a surface of the article and simultaneously applying sufficient external heat to the carrier web for a period of less than about two seconds so that the ink layer becomes tacky and the carrier web separable from the transferred ink design layer and subsequently postheat treating the transferred ink design on the article by exposing the transferred ink design on the article to an external heat source having a temperature between about 400° F. to about 3,000° F. for a period of less than about two seconds.

11. A method as in claim 10 wherein the screen printing ink comprises a base ink vehicle comprising a resin binder plus pigment, said resin binder comprising a polyamide resin comprised of the reaction product of a diamine and dimerized fatty acid.

12. A method as in claim 11 wherein the dimerized fatty acid comprises a dimerized ethylenically unsaturated fatty acid.

* * * * *